Patented Apr. 30, 1946

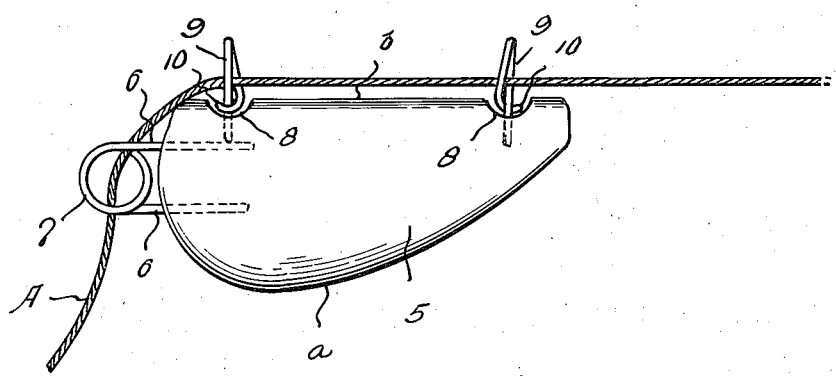
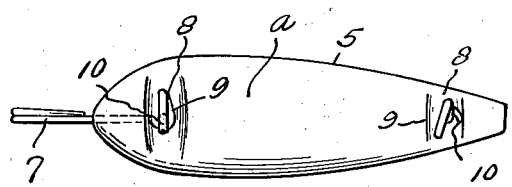

2,399,298

UNITED STATES PATENT OFFICE 2,399,298

FISHING LINE SINKER

Frank E. Sevegny, Seattle, Wash.

Application September 20, 1944, Serial No. 554,963

2 Claims. (Cl. 43—52)

This invention appertains to new and useful improvements in sinkers for fishing lines, the principal object being to provide a sinker which can be easily adjusted to any position on a fishing line where it will remain until such time as a fish strikes the line and exerts a pull, thereby releasing the line from detent means on the sinker, to the end that the sinker will ride down the line to the hooked fish, thereby clearing the line so that it can be reeled in.

Another important object of the invention is to provide a fishing line sinker provided with line guiding means permitting quick application of a fishing line thereto.

Another important object of the invention is to provide a fishing line sinker provided with guide eyes which can be quickly threaded and which in the use of the sinker will not tend to collect seaweed and other foreign matter.

Other objects and advantages of the invention shall become apparent to the reader of the following description.

In the drawing:

Figure 1 is a side elevational view of the improved sinker applied to a fishing line.

Figure 2 is a top plan view of the sinker.

Figure 3 is an end elevational view of the sinker.

Referring to the drawing wherein like numerals designate like parts, it can be seen that numeral 5 denotes a sinker which is shaped with a rounded side portion $a$ and a straight edge portion $b$. This type of sinker is used in certain fishing areas and especially in fishing for salmon.

The forward end of the sinker body 5 at the leg portions 6, 6 has a closed coil spring 7 embedded therein, the coil spring projecting forwardly so that a fishing line A can be frictionally retained between the convolutions thereof.

At the forward and rearward ends of the straight edge portion $b$ of the sinker 5 are depressions 8, 8. Rising from the bottoms of these depressions 8 are line guides 9, 9, each of which has its upper end curved to form an eye with its extremity hooked about the shank of the guide in a manner denoted by numeral 10. This extremity 10 assumes a position in the corresponding recess 8, that is within the bounds of the straight edge $b$, to the end that the same is not apt to catch against seaweed and other foreign matter.

It can now be seen, that in order to apply the sinker to a fishing line, all that is necessary is to engage the line between the extremities 10 of the guides and the shanks of the guides to thread the line through the guides, after which the line is pressed between the convolutions of the coiled spring 7 for frictionally holding the sinker at a desired place on the line.

When the line is jerked by a caught fish, the line A will be pulled loose from the coiled spring 7, thus freeing the sinker, so that the same can slide down the line to the caught fish, thus freeing the line so that it can be wound on the fisherman's reel.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A sinker of the character described comprising a body having means at one end for releasably holding a fishing line, a guide on the body through which the line is threaded slidably lengthwise, said guide consisting of a member secured at its inner end to and protruding from the body and having its intermediate portion curved and looped to provide an eye, the outer end of the member terminating in a transversely bent portion extending crosswise against the body attached protruding base portion of the guide member, said sinker body being formed with a recess at said guide and the so formed and positioned outer end of the guide member being disposed within and located contiguous to the bottom of said recess.

2. A fishing sinker comprising a body provided with a pair of guides thereon and in alignment on one side of the body, means on the sinker for frictionally and releasably retaining a fishing line, said sinker body being formed with recesses at each of the guides, said guides respectively consisting of a member secured at its inner end to and projecting outwardly from the body and each member being coiled intermediate its ends to provide a fishing line guide, the outer ends of the guide members each terminating in a transversely bent portion extending crosswise against the body attached protruding base portion of the guide member and disposed within and located contiguous to the bottom of the companion recess.

FRANK E. SEVEGNY.